(12) United States Patent
Silkey et al.

(10) Patent No.: US 7,637,455 B2
(45) Date of Patent: Dec. 29, 2009

(54) INLET DISTORTION AND RECOVERY CONTROL SYSTEM

(75) Inventors: Joseph S. Silkey, Florissant, MO (US); Christopher D. Wilson, St. Louis, MO (US); Richard S. Dyer, Maryland Heights, MO (US)

(73) Assignee: The Boeing Company, Chicago, IL (US)

( * ) Notice: Subject to any disclaimer, the term of this patent is extended or adjusted under 35 U.S.C. 154(b) by 372 days.

(21) Appl. No.: 11/403,252

(22) Filed: Apr. 12, 2006

(65) Prior Publication Data

US 2007/0241229 A1    Oct. 18, 2007

(51) Int. Cl.
    *B64D 33/02*    (2006.01)
(52) U.S. Cl. .................. 244/53 B; 244/204; 244/204.1
(58) Field of Classification Search ............... 244/53 R, 244/53 B, 60, 204, 205, 200.1, 201, 204.1; 137/15.1, 15.2
    See application file for complete search history.

(56) References Cited

U.S. PATENT DOCUMENTS

| | | | | |
|---|---|---|---|---|
| 2,694,357 | A | * | 11/1954 | Lee .............................. 454/76 |
| 3,041,827 | A | * | 7/1962 | Ferri ............................ 138/40 |
| 3,333,794 | A | * | 8/1967 | Manns ...................... 244/53 B |
| 3,360,220 | A | * | 12/1967 | Meyer ......................... 244/205 |
| 4,154,256 | A | * | 5/1979 | Miller ........................ 137/15.1 |
| 4,655,413 | A | | 4/1987 | Genssler et al. |
| 4,696,442 | A | * | 9/1987 | Mazzitelli ................. 244/53 B |
| 4,891,600 | A | * | 1/1990 | Cox ............................ 315/501 |
| 5,058,837 | A | * | 10/1991 | Wheeler .................. 244/200.1 |
| 5,447,283 | A | * | 9/1995 | Tindell ........................ 244/207 |
| 5,598,990 | A | * | 2/1997 | Farokhi et al. ........... 244/200.1 |
| 5,749,542 | A | | 5/1998 | Hamstra et al. |
| 5,779,189 | A | | 7/1998 | Hamstra et al. |
| 6,138,950 | A | * | 10/2000 | Wainfan et al. ........... 244/53 B |
| 6,200,539 | B1 | | 3/2001 | Sherman et al. |
| 6,570,333 | B1 | | 5/2003 | Miller et al. |

(Continued)

FOREIGN PATENT DOCUMENTS

WO    WO-02/081303 A    10/2002

OTHER PUBLICATIONS

Arvind Santhanakrishnan, Karthik Ramakumar, and Jamey Jacob, "Characteristics of a Plasma Synthetic Jet", Handout from Presentation to DFD05 Meeting of The American Physical Society, Nov. 20, 2005.

(Continued)

*Primary Examiner*—Michael R Mansen
*Assistant Examiner*—Philip J Bonzell
(74) *Attorney, Agent, or Firm*—Toler Law Group

(57) ABSTRACT

An air induction system for an aircraft to control distortion and pressure recovery for improved aerodynamic performance. The system includes an inlet and at least one dielectric barrier discharge generator positioned upstream of the engine for imparting momentum to a low-energy boundary layer of air. A plurality of spaced dielectric barrier discharge generators may be activated in selected combinations to optimize performance at respective flight conditions. In one embodiment, one or more generators may be oriented generally transverse relative to the flow of intake air to eject the boundary layer in a lateral direction and prevent its ingestion by the engine. In another embodiment, one or more generators may be oriented along the direction of flow to accelerate the boundary layer air.

34 Claims, 12 Drawing Sheets

U.S. PATENT DOCUMENTS

| | | | |
|---|---|---|---|
| 6,796,532 | B2 | 9/2004 | Malmuth et al. |
| 7,017,863 | B2* | 3/2006 | Scott et al. .................. 244/205 |
| 7,380,756 | B1* | 6/2008 | Enloe et al. .................. 244/175 |
| 2002/0134891 | A1* | 9/2002 | Guillot et al. ............... 244/199 |
| 2004/0011917 | A1 | 1/2004 | Saeks et al. |
| 2004/0118973 | A1 | 6/2004 | Malmuth et al. |
| 2004/0195462 | A1 | 10/2004 | Malmuth et al. |
| 2006/0022092 | A1* | 2/2006 | Miller et al. ............. 244/200.1 |
| 2008/0023589 | A1* | 1/2008 | Miles et al. .................. 244/205 |

OTHER PUBLICATIONS

C.L.Enloe, Thomas E: McLaughlin, Robert D. Vandyken, K.D. Kachner, Eric J. Jumper, Thomas C. Corke, M. Post, and O.Haddad, "Mechanisms and Responses of a Single Dielectric Barrier Plasma Actuator: Geometric Effects", AIAA Journal, Mar. 2004, pp. 595-604, vol. 42, No. 3.

C.L.Enloe, Thomas E. McLaughlin, Robert D. Vandyken, K.D. Kachner, and Eric J. Jumper, "Mechanisms and Responses of a Single Dielectric Barrier Plasma", 41st Aerospace Sciences Meeting and Exhibit, Jan. 6-9, 2003, AIAA 2003-1021, Reno, Nevada.

Martiqua L. Post and Thomas C. Corke, "Separation Control on High Angle of Attack Airfoil Using Plasma Actuators", 41st Aerospace Sciences Meeting and Exhibit, Jan. 6-9, 2003, AIAA 2003-1024, Reno, Nevada.

David M. Van Wie and Ashish Nedungadi, "Plasma Aerodynamic Flow Control for Hypersonic Inlets", 40th AIAA Joint Propulsion Conference, Jul. 11-14, 2004, AIAA 2004-4129, Fort Lauderdale, Florida.

Thomas C. Corke and Martiqua L. Post, "Overview of Plasma Flow Control: Concepts, Optimization, and Applications", 43rd AIAA Aerospace Sciences Meeting and Exhibit, Jan. 10-13, 2005, AIAA 2005-563, Reno, Nevada.

J.W. Baughn, C.O. Porter, B.L. Peterson, T.E. McLaughlin, C.L. Enloe, G.I. Font, and C. Baird, "Momentum Transfer for an Aerodynamic Plasma Actuator with an Imposed Boundary Layer", 44th AIAA Aerodynamic Sciences Meeting and Exhibit, Jan. 9-12, 2006, AIAA 2006-168, Reno, Nevada.

J. Shin, V. Narayanaswamy, L.L. Raja, and N. Clemens, "Generation of Plasma Induced Flow Actuation by DC Glow-like Discharge in a Supersonic Flow", 44th AIAA Aerospace Sciences Meeting and Exhibit, Jan. 9-12, 2006, AIAA 2006-169, Reno, Nevada.

Arvind Santhanakrishnan and Jamey D. Jacob, "On Plasma Synthetic Jet Actuators", 44th AIAA Aerospace Sciences Meeting and Exhibit, Jan. 9-12, 2006, AIAA 2006-317, Reno, Nevada.

J. Reece Roth and Xin Dai, "Optimization of the Aerodynamic Plasma Actuator as an Electrohydrodynamic (EHD) Electrical Device", 44th AIAA Aerospace Sciences Meeting and Exhibit, Jan. 9-12, 2006, AIAA 2006-1203, Reno, Nevada.

* cited by examiner

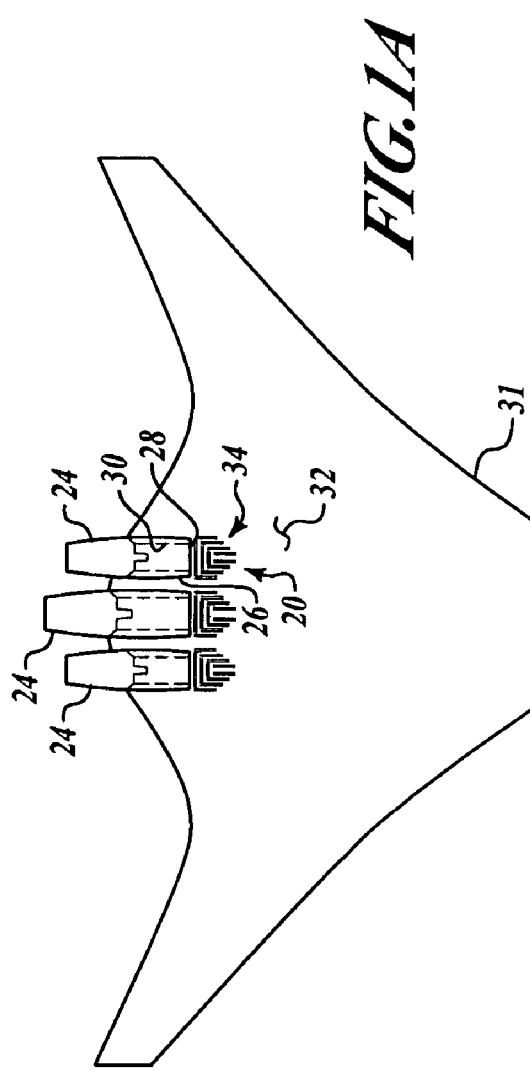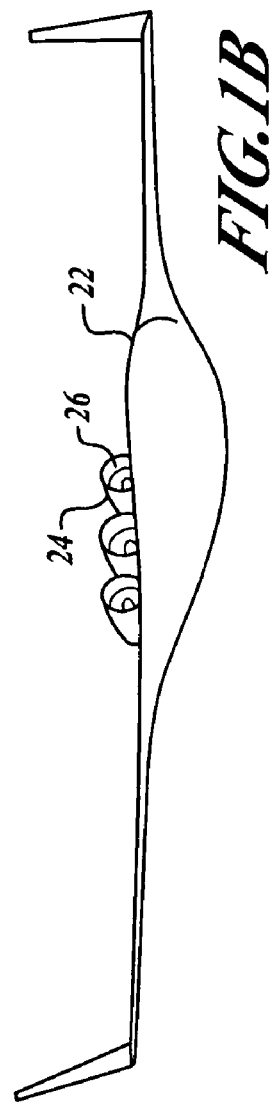

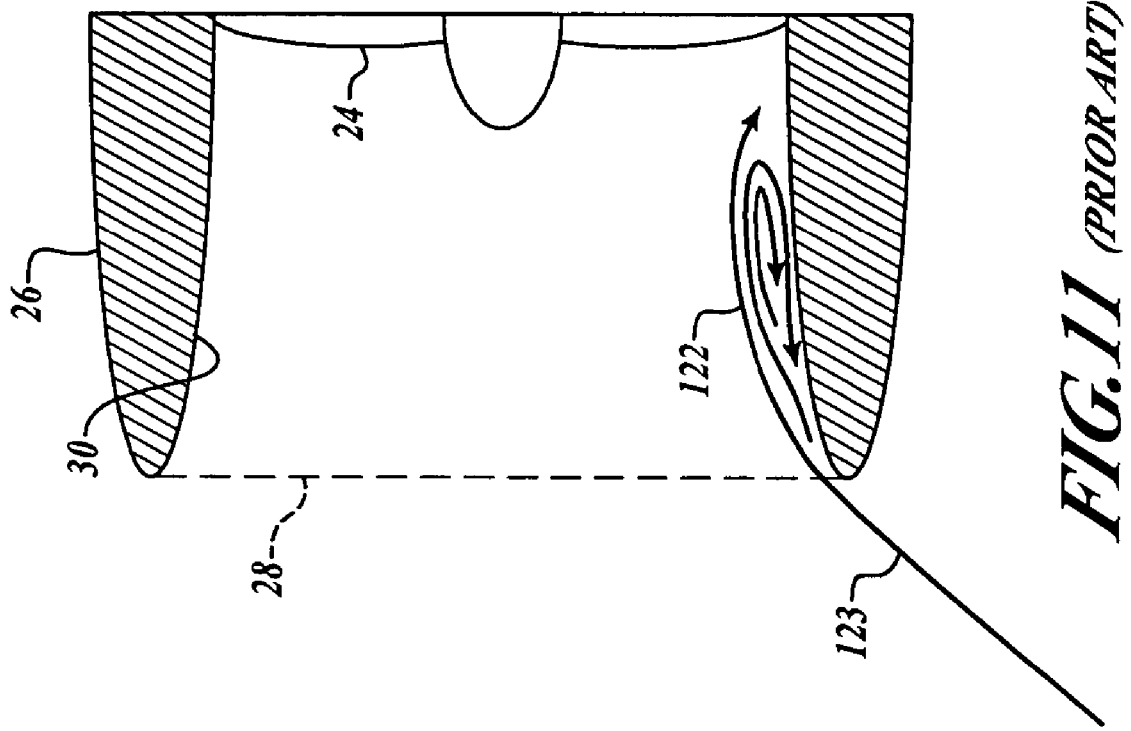

INLET DISTORTION AND RECOVERY CONTROL SYSTEM

BACKGROUND

During flight, a boundary layer of low-energy air builds up on surfaces of an aircraft. The boundary layer is a thin film of low velocity, low dynamic pressure air located near a solid boundary resulting from the air being at rest along the solid boundary. The boundary layer which forms on surfaces located upstream of an engine can become ingested by the engine and decrease the recovery of total pressure and corresponding thrust performance. Further, the ingested boundary layer degrades distortion (i.e., a measurement of the quality or uniformity of flow characteristics) and thereby decreases stability of engine operation.

These problems are aggravated for inlets which require the flow to undergo any significant turn in flow direction. A turn produces large pressure gradients and secondary flows which increase thickness of the boundary layer or cause it to separate from the surface.

The boundary layer is especially susceptible to separate from a surface when a shock wave interacts with the boundary layer. That produces large viscous losses, low total pressure, and poor flow quality at the engine face.

Consequently, many aircraft have employed some type of boundary layer removal or reduction system to ensure stable engine operation and high aerodynamic performance. Example systems include boundary layer diverters, "bump" boundary layer deflectors, vortex generators, porous surfaces to "bleed" the flow, inlet throat slots, side wall cut back, air injection, and overboard bypass ducts. Unfortunately, these systems are complex and can entail a substantial increase in aircraft weight and/or volume. Moreover, they are optimized for one flight condition or throttle setting and are not adjustable. They can become less effective at a variety of speeds, altitudes, angles of attack or side-slip, and engine air flow rates.

The foregoing examples of related art and limitations associated therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems and methods which are meant to be exemplary and illustrative, not limiting in scope. In various embodiments, one or more of the problems described above in the Background have been reduced or eliminated, while other embodiments are directed to other improvements.

An exemplary air induction system is well-suited for use on an aircraft. An exemplary air induction system includes an inlet including an aperture to receive intake air for delivery toward an engine of the aircraft. A surface is positioned upstream of the aperture such that at least a portion of the intake air moves past the surface prior to being received by the aperture. A control system includes a dielectric barrier discharge generator positioned along the surface for imparting momentum to the intake air.

According to an aspect, the inlet has a longitudinal axis for alignment generally with a direction of flow of the intake air, and the dielectric barrier discharge generator may be oriented such that it is not aligned with the axis to thereby impart momentum in a direction having at least a component transverse to the direction of flow. Alternately, the dielectric barrier discharge generator may be oriented generally transverse to the longitudinal axis such that the generator imparts momentum generally transverse to the direction of flow.

In addition to the exemplary embodiments and aspects described above, further embodiments and aspects will become apparent by reference to the drawings and by study of the following detailed description.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIG. 1A is a schematic plan view of an aircraft with an exemplary air induction system;

FIG. 1B is a perspective of the aircraft of FIG. 1A;

FIG. 11 is a schematic view of an inlet of the prior art;

DETAILED DESCRIPTION

Figure 2:
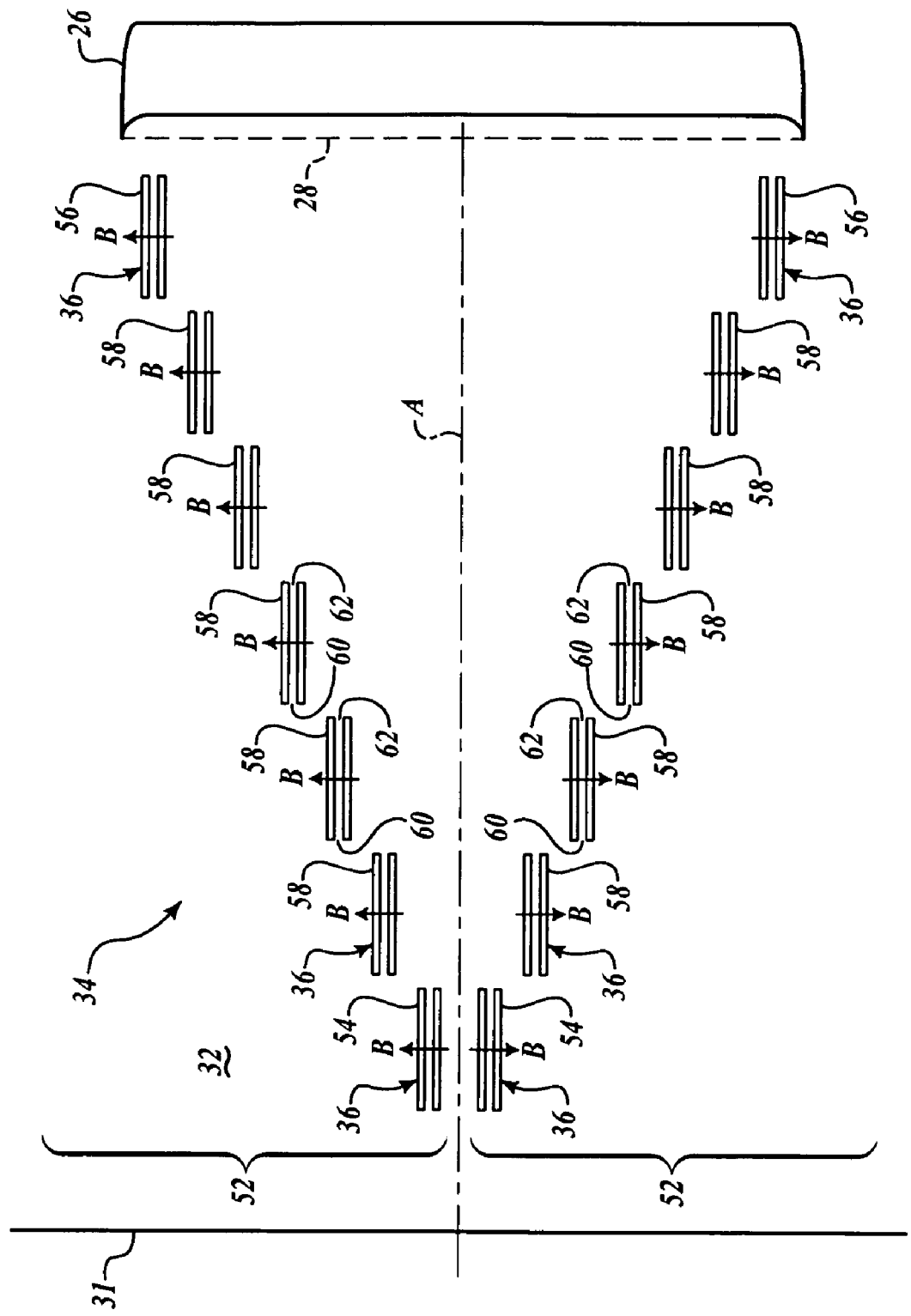
FIG. 2 is a plan view of a configuration of generators according to a first embodiment.

Given by way of overview and referring to FIGS. 1A and 1B, an exemplary air induction system 20 is installed on an aircraft 22 to minimize or, in some cases, possibly eliminate the boundary layer and thereby provide intake air at an improved quality to a corresponding engine 24. The system 20 is adjustable to more effectively meet thrust and power requirements throughout the aircraft envelope at a variety of speeds, altitudes, and angles of attack or side-slip than the prior art. Although the aircraft 22 shown in FIGS. 1A and 1B is a blended wing-body with engines located aft, it is understood that the system 20 may be used with various configurations of any machine capable of atmospheric flight, including without limitation tube and wing aircraft, commercial transports, private airplanes, missiles, rotorcraft, or unmanned aircraft. The system 20 may be applied to an inlet or intake for any component(s), including not only propulsive engine 24 but also an auxiliary power unit (not shown) or environmental control system (not shown).

The air induction system 20 includes an inlet 26 with an aperture 28 configured to receive the intake air. Depending upon the aircraft configuration, the aperture 28 may be blended into the fuselage (e.g., in a fighter aircraft), or may be in a podded nacelle spaced from the fuselage (e.g., in a commercial airliner). A passageway 30 extends from the aperture 28 for delivery of the air toward the engine 24. The inlet 26 has a longitudinal axis A, at least a portion of which is generally aligned with a direction of flow of the intake air as it approaches the inlet. For the configuration shown in FIG. 1, the inlet 26 is located on the aircraft 22 at a point well behind a forward, leading edge 31 of the fuselage. Accordingly, a surface 32 of the fuselage is positioned upstream of the aperture 28 such that intake air moves past the surface prior to being received by the inlet. A boundary layer of low-velocity air builds on the surface 32 beginning from the leading edge 31 and moves toward the inlet 26.

Referring to FIG. 2, the air induction system includes an exemplary control system 34. The control system 34 includes an arrangement of single dielectric barrier discharge generators 36 positioned along the surface 32 upstream of the aperture 28. The generators 36 are used as active flow control devices which reduce or eliminate ingestion of low-energy boundary layer air into the engine 24. The system 34 thereby increases aerodynamic performance and/or engine operational stability by improving pressure recovery and distortion, respectively.

Although the system shown in each of the embodiments herein has several generators 36, there could be only a single generator or any number of generators as desired for a particular application. Further, although the surface 32 upstream of the aperture includes a part of the aircraft fuselage which is smooth, flat, and generally horizontal, the surface suitably may be on any component part and may be curved, stepped, rough, and/or at any orientation including vertical, as desired for a particular application.

Figure 3:
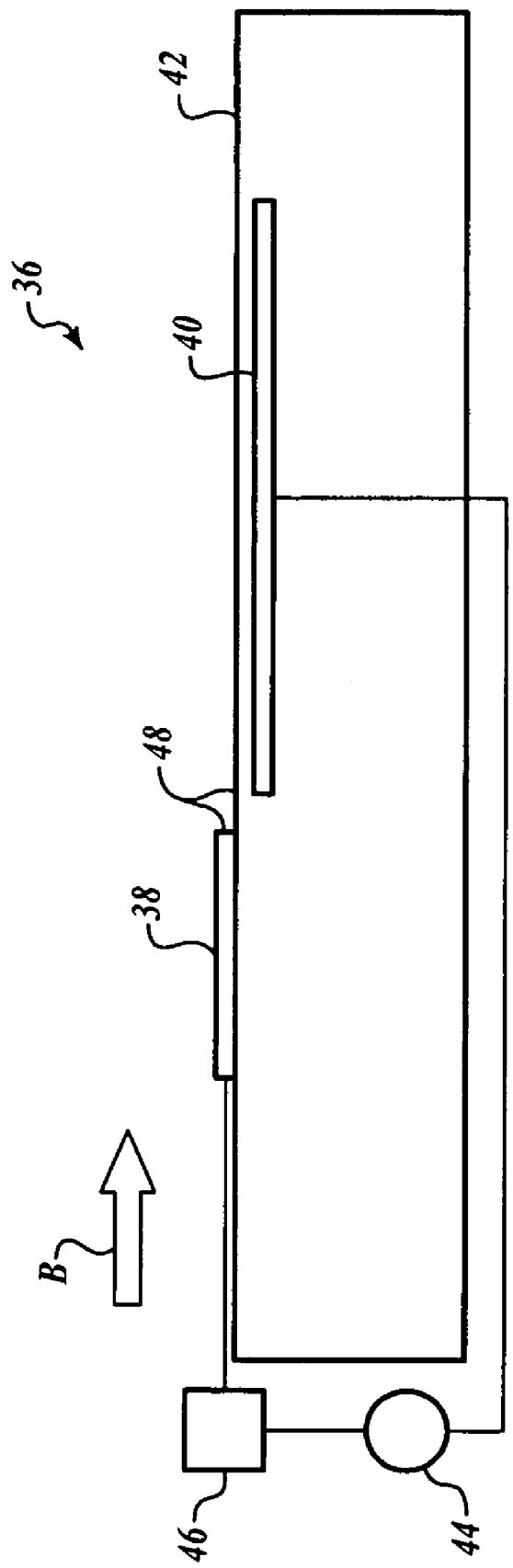
FIG. 3 is a schematic section of an exemplary single dielectric barrier discharge generator.

Single dielectric barrier discharge generators 36 (hereinafter, "generators"), also known as plasma actuators, have previously been demonstrated to affect boundary layers along airfoil surfaces. Referring additionally to FIG. 3, each generator 36 includes a pair of parallel, offset electrodes 38 and 40 separated by a dielectric barrier 42. The electrode 38 is exposed to the air, while the electrode 40 is covered by the dielectric 42. The relative positions and spacings of the electrodes 38 and 40 may vary as desired for a particular application. Both of the electrodes 38 and 40 are connected to a power supply 44 and a system controller 46. In one embodiment, each electrode 38 and 40 is elongate in shape and can be arranged on the surface 32 either straight or with curvature. Each generator 36 is constructed of suitable materials that are lightweight, low cost, and readily attached to or embedded in a surface of an aircraft or inlet. The generator suitably is thin (such as without limitation less than about 0.1 inch) so that it does not project significantly above the surface or substantially obstruct flow of air along the surface. An exemplary electrode includes a strip of copper foil tape, with an exemplary dielectric comprising a strip of polyimide tape. Other arrangements and materials may be used as desired for a particular application.

Under input of high voltage, high frequency alternating current electricity from the power supply 44, air located near an interfacial gap 48 between the electrodes 38 and 40 is ionized, thereby creating a region of discharge plasma. An exemplary voltage is within a range between 5 kV and 25 kV. The generator 36 exerts a force upon the ionized particles capable of changing the path of motion of the particles against other forces, such as inertia, which tend to maintain the particles in their normal path. That force is produced by the electric field operating on the ions in the plasma. The force acts on the air as a whole, not just the ions, because of collisions between ions and neutral particles. Thus the entire stream in proximity to the generator 36 is drawn toward the electrode 40. The flow is energized with increased momentum in a near-surface region, both at the electrode and, due to downstream flow propagation, for a certain distance extending downstream. Accordingly, flow separation can be delayed or prevented. If the flow has previously separated, it can be re-attached. The direction of the momentum which is imparted is generally aligned with an arrow B, that is, in a direction parallel with the surface and from the exposed electrode 38 toward the covered electrode 40.

An orientation of a generator 36 is defined herein as the direction in which it imparts momentum, i.e., generally perpendicular to a length direction of the electrodes. That direction is shown by the arrows B on the various drawings. Each dielectric barrier discharge generator 36 advantageously remains free from a magnet, unlike some flow control devices which require a magnetic field to operate. It thereby avoids the associated weight, volume, and performance penalties of carrying a magnet or electromagnet.

Advantageously, momentum is imparted to a flow of air in a direction which may not be aligned with the initial direction of flow as it approaches the inlet. That facilitates a transverse deflection of low-energy boundary layer air. The generators 36 are generally straight and oriented transverse to the flow (i.e., transverse to axis A) so that the applied force direction is generally perpendicular to the flow, although other, oblique angles are envisioned. Unlike a system which imparts momentum in a direction aligned with the flow and merely accelerates that flow, a generator which is not aligned provides a component transverse to the flow to divert air toward a more advantageous path of motion. The generators 36 which are misaligned with the direction of flow tend to laterally eject the boundary layer from that stream of air which will be captured by the engine. Consequently, pressure recovery is increased and/or distortion of the intake air is reduced.

The misalignment between the freestream flow and an underlying lateral flow component also advantageously creates vorticity and enhances mixing of the boundary layer flow. The result of vortex generation is a transfer of momentum to the lower portions of the boundary layer. That increases its energy to minimize negative impacts if it should be ingested by the engine. As with conventional vortex generators, vortices also delay separation should the boundary layer encounter an adverse pressure gradient.

The control system 34 includes two opposing sets 52 of generators 36 located on opposite sides of the longitudinal axis A. The sets 52 suitably are generally symmetric about the axis A. However, the sets 52 may be asymmetric, or there may be a single set along a single side of the axis A as desired for a particular application. Each set 52 has a forward generator 54, a rearward generator 56, and several intermediate generators 58 disposed generally between the generators 54 and 56. Each of the generators 54, 56, and 58 has a front end 60 and a back end 62. The relative axial position of each generator is defined herein by the axial location of its front end 60. In the exemplary control system 34, the back end 62 of each generator 54, 56, and 58 is positioned slightly upstream of the front end 60 of the next successive generator.

Each of the generators of the system 34 is generally straight and parallel to the other generators to thereby impart force and momentum in a common direction. Further, the generators form a sequence wherein each generator is spaced from the longitudinal axis A by a distance which is greater than a corresponding spacing of the generators upstream. In other words, each successive downstream generator is spaced farther from the axis A. In this way, the boundary layer is successively swept laterally outward and to a point outside of the capture region of the inlet aperture 28.

The control system 34 substantially reduces the amount of low-energy boundary layer air from reaching the engine. In this regard, it functions as an alternative to a supersonic "bump" inlet that diverts boundary layer laterally by blocking the flow with a large protrusion at the inlet aperture which causes formation of shock waves. Therefore, the exemplary control system 34 avoids the disadvantages of weight and volume inherent with such a bump. Further, the control system 34 is effective at all speeds, unlike the bump inlet which diverts a boundary layer only at supersonic speeds. Moreover, the control system 34 does not generate shock waves, and therefore provides better pressure recovery than a bump inlet.

Figure 4:
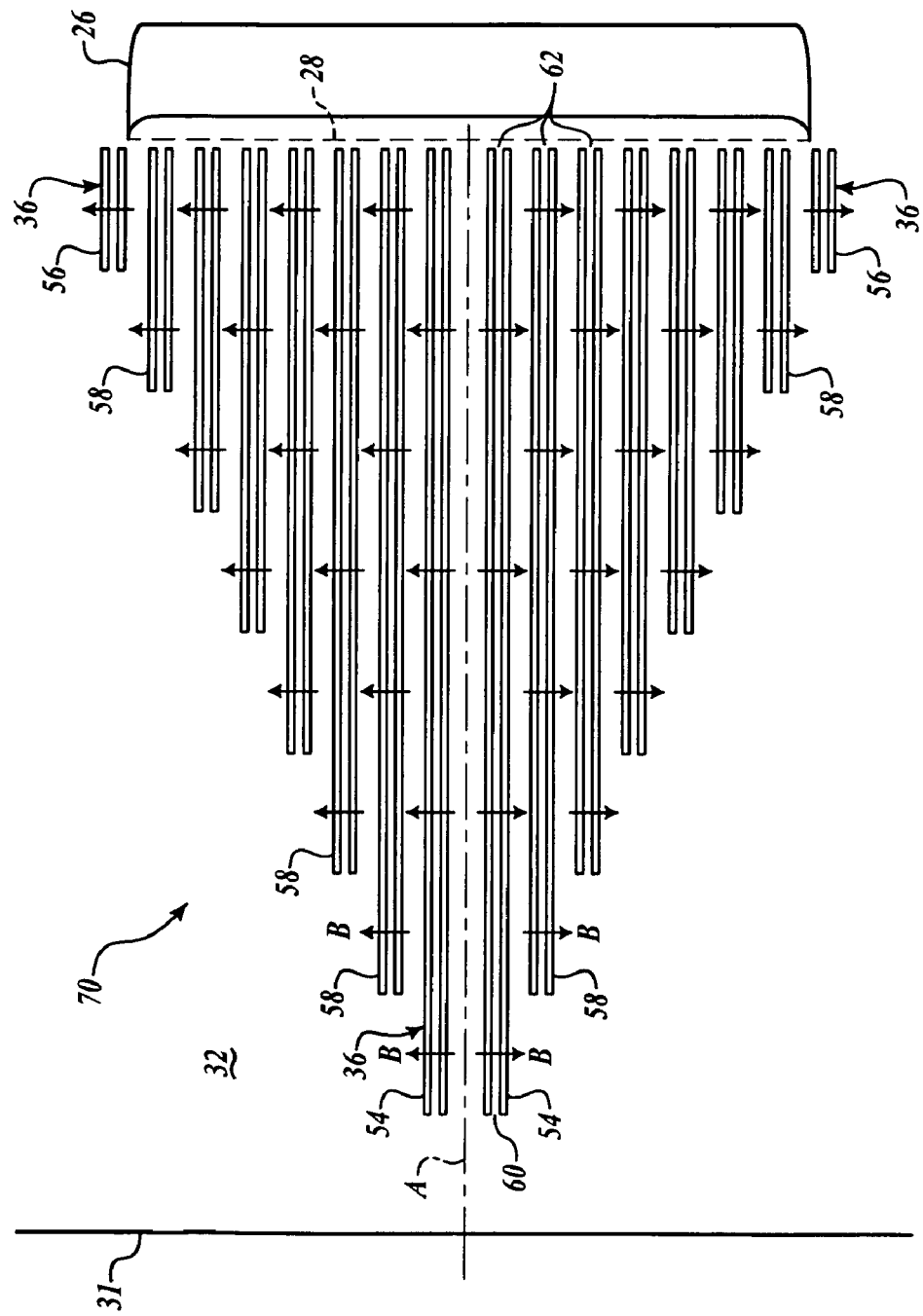
FIG. 4 is a plan view of a configuration of generators according to a second embodiment.

Referring now to FIG. 4, an exemplary control system 70 according to another embodiment includes generators 36 having greater length than the generators of the control system 34 (FIG. 2). The greater length can increase the transverse force and thereby increase the effectiveness of momentum transfer to the boundary layer. Each of the generators 54, 56, and 58 has its back end 62 at a common axial location with the other generators.

Figure 5:
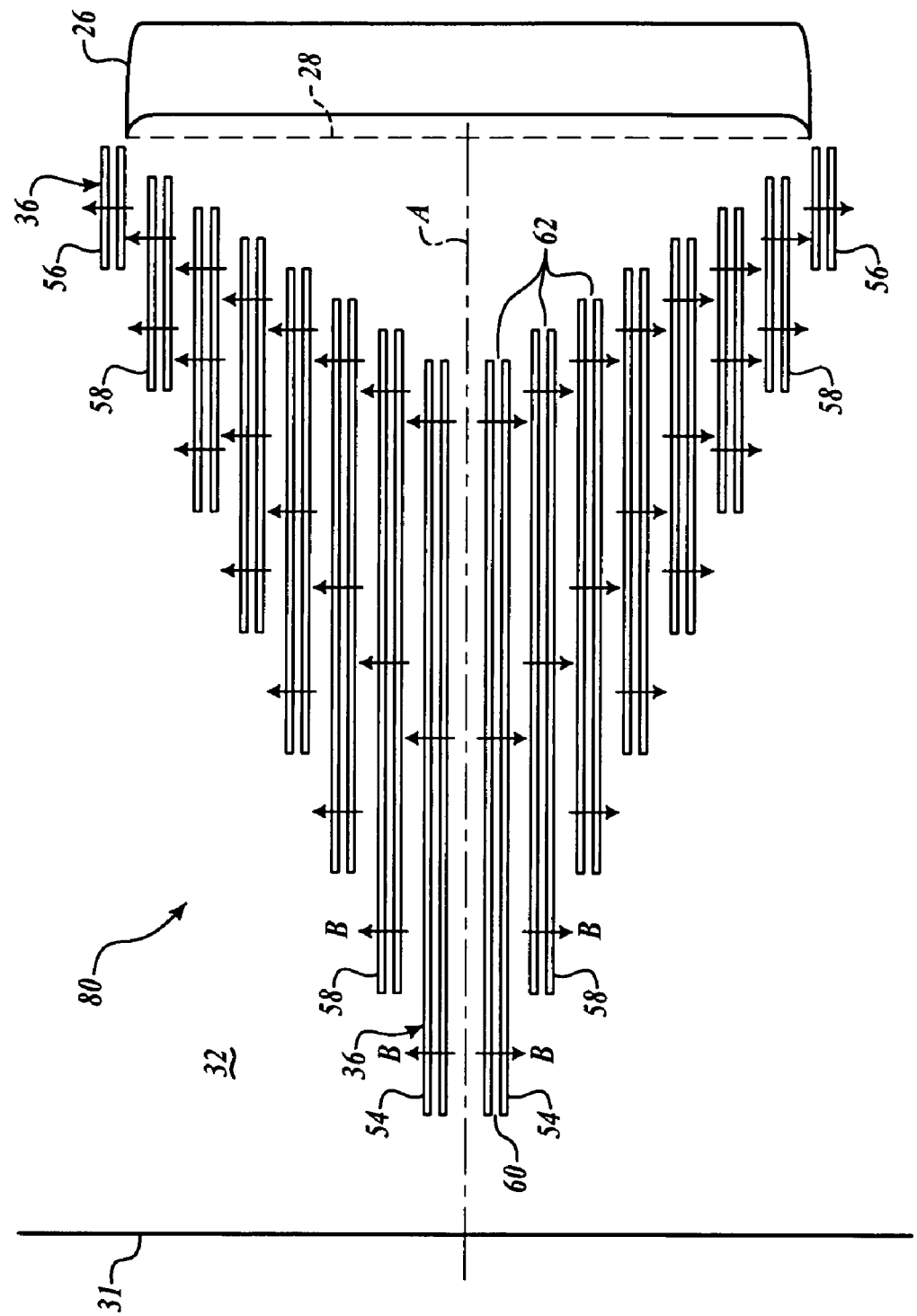
FIG. 5 is a plan view of a configuration of generators according to a third embodiment.

Referring now to FIG. 5, an exemplary control system 80 according to another embodiment is similar to the control system 70 (FIG. 4). However, the back ends 62 of the generators 54, 56, and 58 are positioned at different axial locations. This offers the advantage of reduced generator length and cost. Like in the control system 34 (FIG. 2), the generators positioned closer to the center of the inlet 26 have back ends which are sequentially further forward than generators spaced farther from the center. That is because it can become impractical to divert the boundary layer laterally from the center region due to insufficient distance remaining prior to the boundary layer entering the aperture 28.

Figure 6:
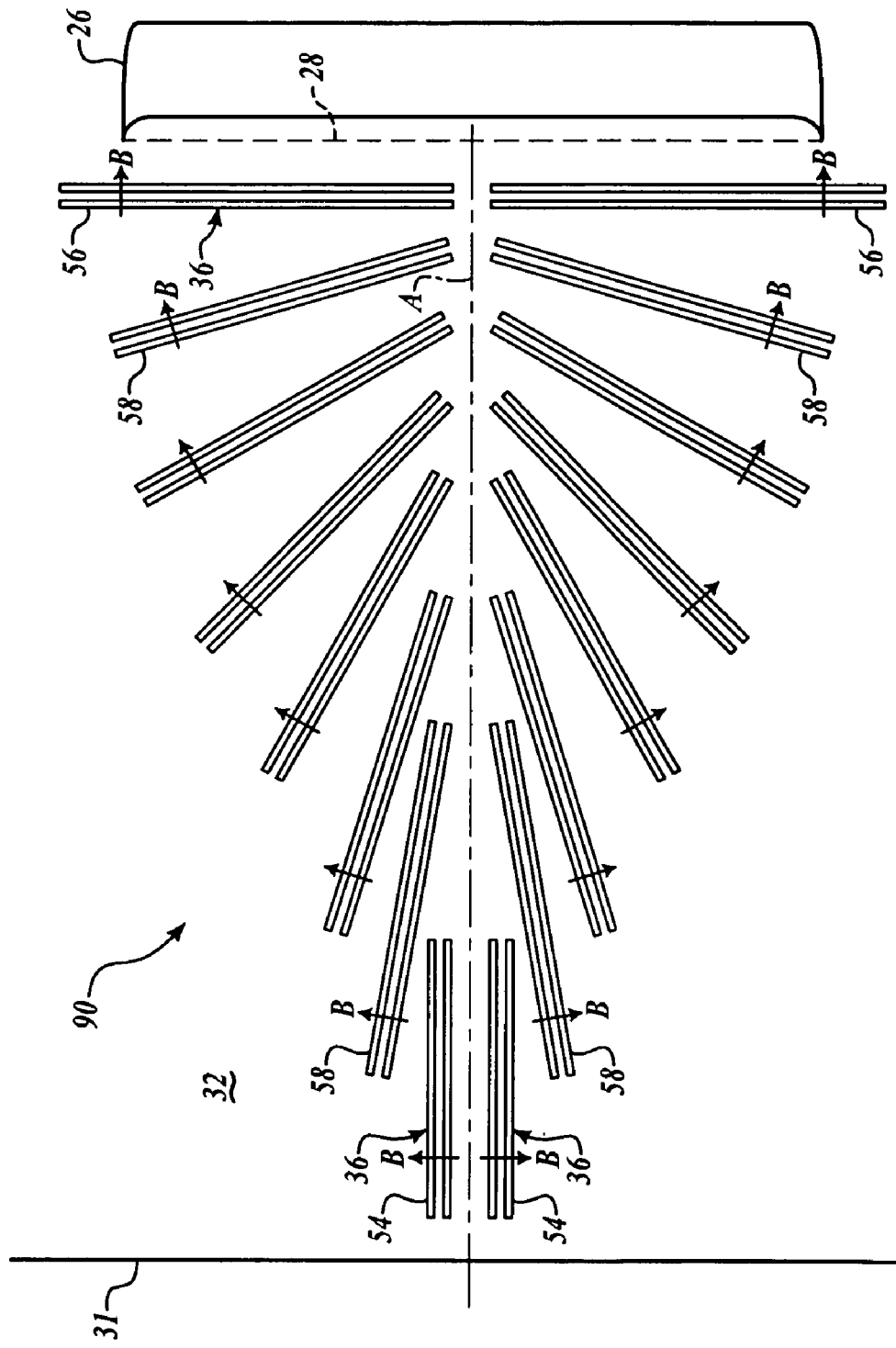
FIG. 6 is a plan view of a configuration of generators according to a fourth embodiment.

Referring now to FIG. 6, an exemplary control system 90 according to another embodiment has generators 36 oriented at various angles. The forward generator 54 is transverse to the flow so that all imparted force tends to laterally divert the boundary layer. The successive downstream generators 58 are placed at successively shallower angles to gradually transition the direction of applied force to being parallel with the incoming flow. The rearward generator 56, which is located closest to the inlet aperture 28, is oriented generally parallel with the axis A (i.e., the applied momentum vectors B are parallel with the axis A). Accordingly, it accelerates flow along its existing direction to accelerate and improve the boundary layer flow prior to entering the inlet aperture 28. Thus there is a transition in the system 90 from boundary layer diversion upstream to boundary layer acceleration downstream. When flow travels to a region of close proximity to the inlet aperture 28, there is insufficient remaining distance to divert the boundary layer prior to its entering the inlet. It is impractical to divert the boundary layer from that region. Accordingly, the generators therein begin accelerating the boundary layer to minimize negative impacts of ingestion.

Figure 7:
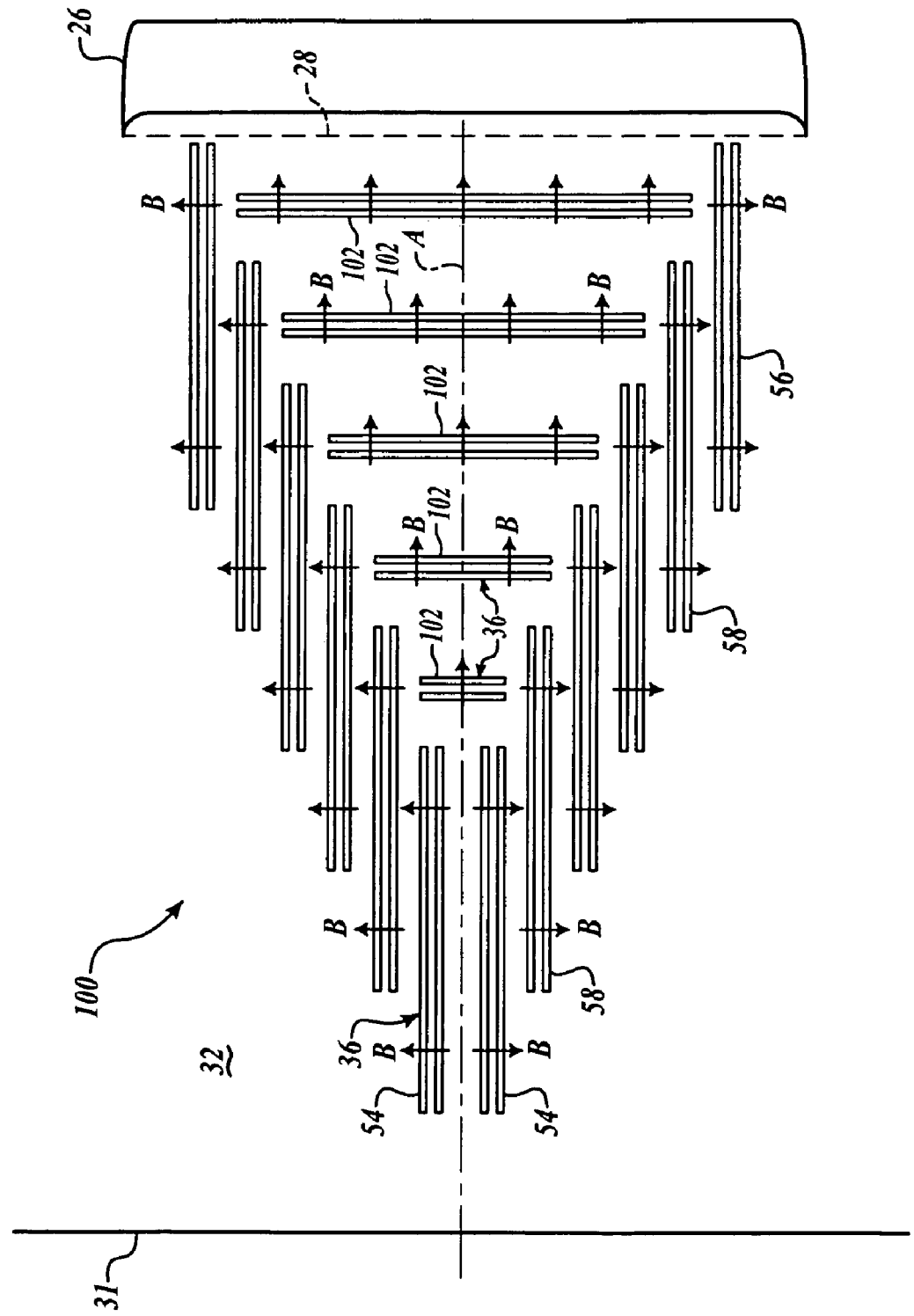
FIG. 7 is a plan view of a configuration of generators according to a fifth embodiment.

Referring now to FIG. 7, an exemplary control system 100 according to another embodiment uses a combination of parallel and perpendicular generators 36. The forward, rearward, and intermediate generators 54, 56, and 58 apply force perpendicular to the flow. A set of one or more accelerating generators 102 applies force parallel to the flow, generally in the direction of the axis A. Like in the control system 90 (FIG. 6), force advantageously is applied in two or more orientations. Upstream, the generators are configured to divert the boundary layer laterally. Once a point is reached where a boundary layer can no longer be laterally diverted prior to entering the inlet, the generators are oriented such that the momentum transfer to the boundary layer accelerates air in a parallel direction.

Figure 8:
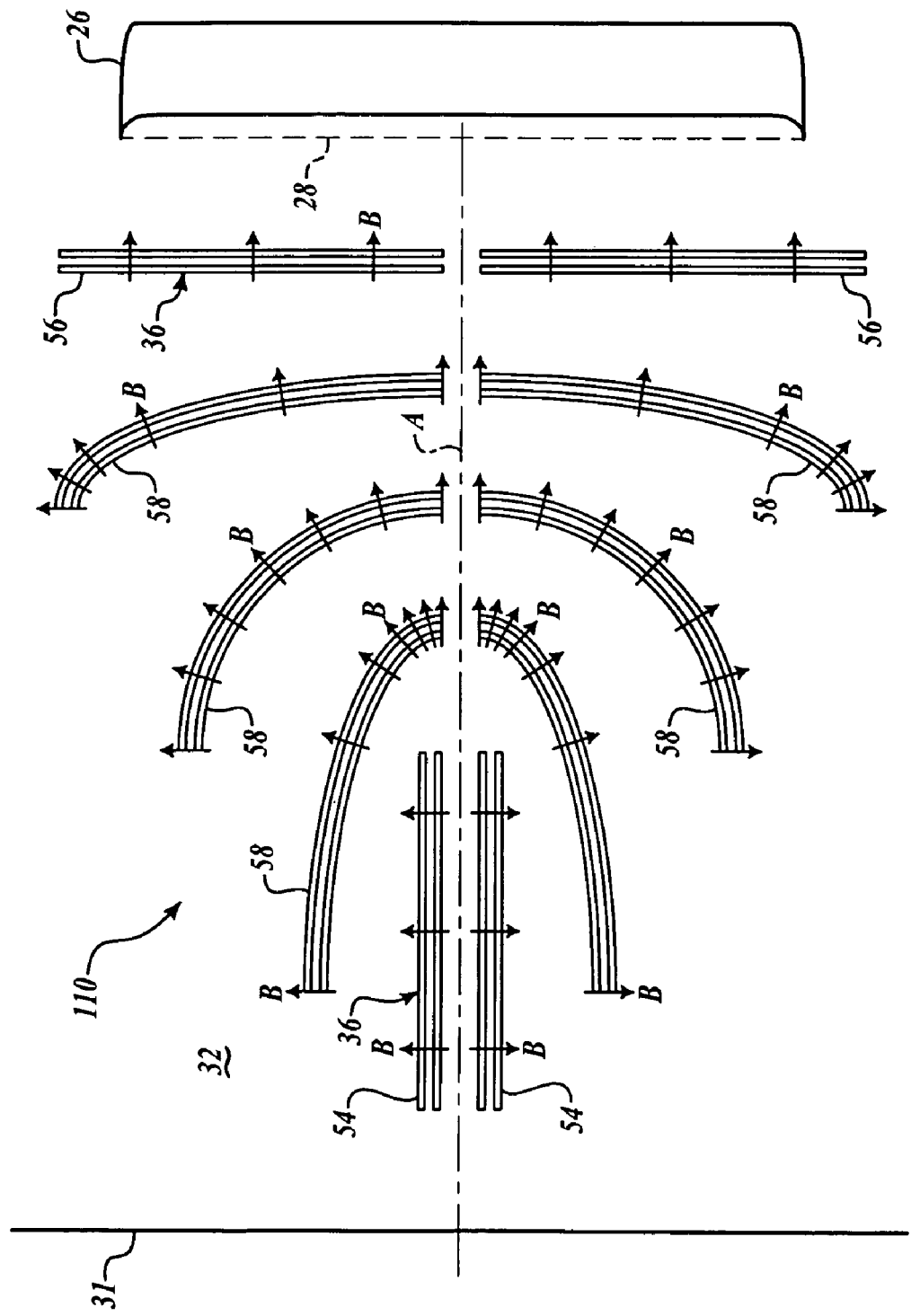
FIG. 8 is a plan view of a configuration of generators according to a sixth embodiment.

Referring now to FIG. 8, in an exemplary control system 110 according to another embodiment, the generators 36 are arranged both straight and with curvature. Each successive intermediate generator 58 has varying curvature. The curvature is defined such that the force is gradually transitioned from diverting to accelerating the boundary layer. The outboard lateral portions of the actuators have a higher curvature, principally to continue diversion of the boundary that was initiated upstream.

As is evident by the configurations of the exemplary control systems 34, 70, 80, 90, 100, and 110 (FIGS. 2 and 4-8), the generator(s) may take a wide variety of arrangements, orientations, numbers, sizes, and curvatures, including many which are not shown herein. The generator(s) may be located entirely forward of the inlet, or partially or entirely within the inlet and rearward of the inlet aperture. A lateral extent of the arrangement of generator(s) may be either less than or greater than a width of the inlet aperture. An optimum arrangement may be selected for the particular aircraft/inlet geometry and anticipated flight conditions.

The control system of each embodiment herein is adjustable to be effective at a variety of flight conditions. Each generator 36 is controlled through system controller 46 and may be activated independently of other generators, if desired. Consequently, a designer has wide latitude in designing the controller 46 to select a combination of generator(s) for activation which will optimize performance. The optimum combination may vary with aircraft speed, angle-of-attack, altitude, side-slip, or engine throttle setting. For example, testing may indicate that engine performance is maximized at takeoff conditions by the activation of all generators 36, but at cruise conditions by the activation of a single generator. Accordingly, the controller 46 will activate and de-activate pre-selected combinations of generators 36 as flight conditions vary to maximize performance throughout an entire flight, including climb, maneuver, cruise, and descent. The generators 36 can be operated in steady state, providing a steady force to reduce or eliminate flow separation. Alternatively, the generators can be operated in a pulsed mode to minimize the required power while still reducing or eliminating flow separation.

Figure 10:
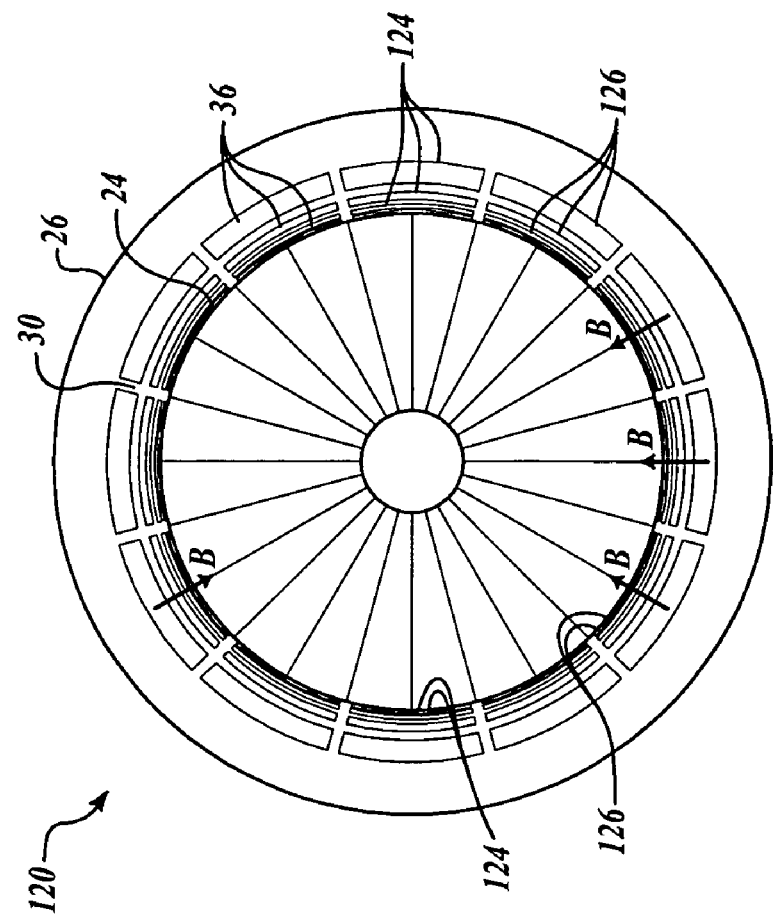
FIG. 10 is a schematic front view of the inlet of FIG. 9.
Figure 9:
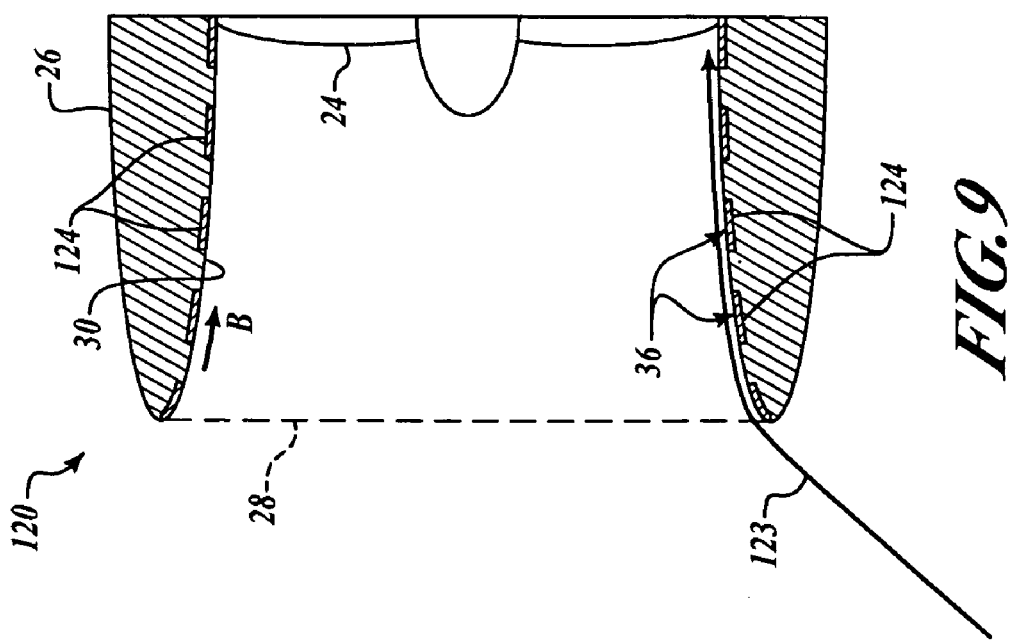
FIG. 9 is a schematic view of a configuration according to a seventh embodiment.

Referring now to FIGS. 9 and 10, an exemplary control system 120 according to another embodiment advantageously eliminates separation within an inlet 26. Although the embodiment is shown with a passageway 30 having a circular cross-section, it is understood that it may be applied to inlets with other shapes including square, "D" shapes, or non-uniform contours. Referring briefly to FIG. 11 for a discussion of shortcomings of the prior art, flow may separate from internal surfaces in the prior art, particularly when the aircraft is at a high angle of attack or sideslip angle. A region 122 of recirculation, or separation bubble, can form inside the inlet which degrades performance in the prior art. Flow can be diverted by the bubble 122, as shown by a schematic streamline 123. Referring back to FIGS. 9 and 10, the control system 120 includes generators 36 arranged in spaced rows 124 (see FIG. 9). The rows 124 are annular and generally concentric in the arrangement of FIG. 10, although other arrangements are envisioned. Each row 124 includes one or more arcuate shaped segments 126. Preferably, the rows 124 extend axially from the aperture 28 to the fan or compressor face of the engine 24.

The generators are oriented to impart momentum generally parallel with the direction of flow and accelerate the boundary layer, as there is no need at this location to laterally eject the boundary layer. Each row 124 and segment 126 is independently powered, which provides for precise control of inlet distortion and recovery. By activating just the row(s) and/or segment(s) of generators which are adjacent to a region 122 of flow separation, the distortion caused by the separation can be eliminated. It is understood that the passageway 30 may have various configurations or shapes, and that rows and segments of generators may have other arrangements as desired for a particular application.

Figure 12:
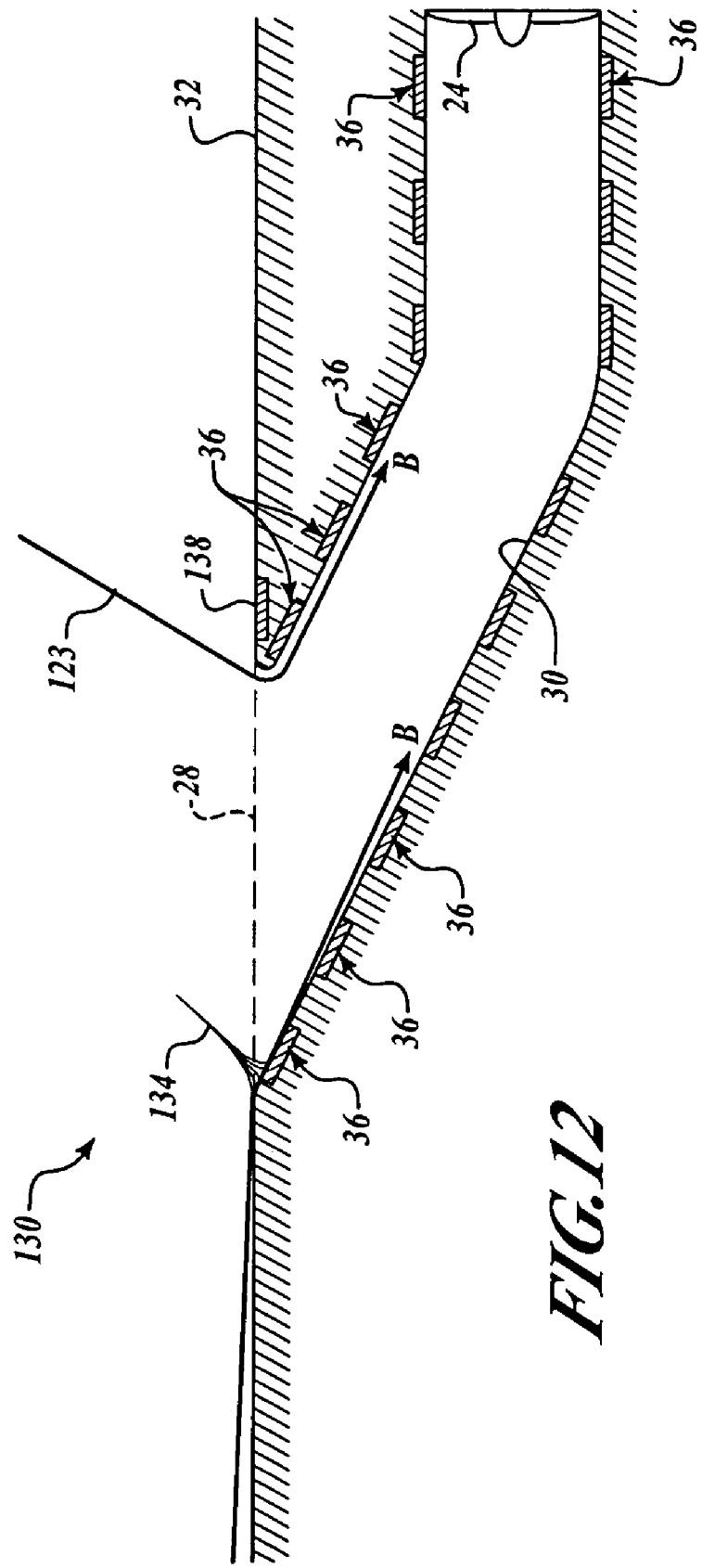
FIG. 12 is a schematic view of an eighth embodiment.
Figure 13:
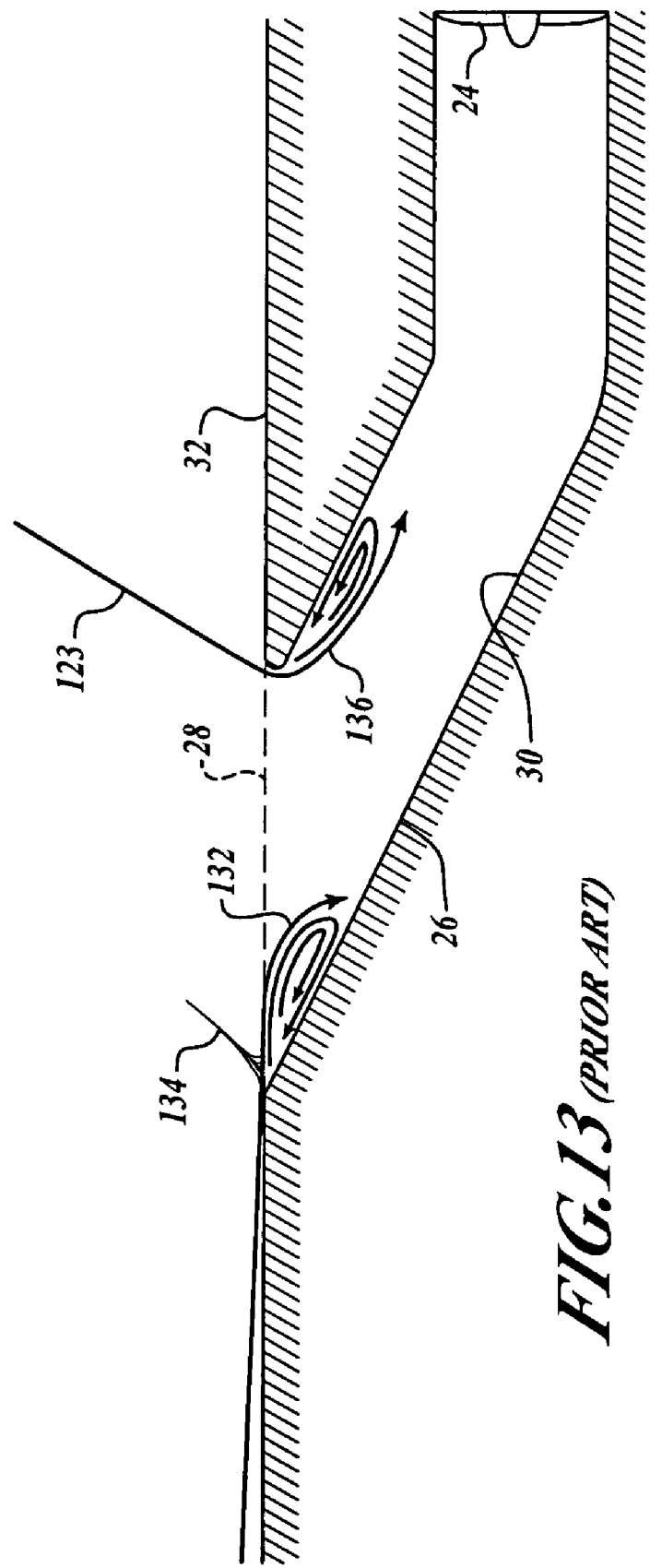
FIG. 13 is a schematic view of another inlet of the prior art.

Referring now to FIG. 12, an exemplary control system 130 according to another embodiment advantageously eliminates separation within an inlet passageway 30, particularly for an inlet in which the flow undergoes a turn in direction. The inlet suitably is a "flush" inlet having an aperture 28 generally even with an adjacent surface 32. Referring briefly to FIG. 13 for a discussion of shortcomings of the prior art, the flush inlet of the prior art is prone to a separation region 136 induced by large flow turning angles. Like other inlets in the prior art, it is also subject to formation of a separation region 132 induced by interaction with a shock wave 134. Referring back to FIG. 12, the control system 130 advantageously includes generators 36 spaced along the surfaces of the passageway 30. Preferably, the generators extend only through a portion of the passageway length, although they may extend along the entirety of the passageway from the aperture 28 to the face of the engine 24. Complete coverage permits control of any local pockets of separation which could arise anywhere along the passageway 30. There may be additional generator (s) positioned outside or upstream of the aperture 28, one such generator 138 being shown on FIG. 12. The generators 36 are oriented to impart momentum generally parallel with the direction of flow and accelerate the boundary layer, as there is no need at this location to laterally eject the boundary layer. The generators may be adapted to the cross-sectional shape of the passageway 30, i.e., straight, curved, or in rows as desired for a particular application. Each generator may be independently controlled, allowing for the precise control of distortion and recovery.

The control system of each of the various embodiments may serve as a replacement for conventional boundary layer diversion systems. Because the system is readily installed, aircraft may be retro-fit with the system while undergoing periodic maintenance. There is minimal impact to aircraft weight and volume. The embodiments disclosed herein advantageously may be combined partially or in entirety, such as to provide boundary layer reduction both in front of and within the interior of an inlet.

While a number of exemplary embodiments and aspects have been illustrated and discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true spirit and scope.

What is claimed is:

1. A system comprising:
an inlet defining a passageway for delivery of intake air toward an engine of an aircraft, wherein the passageway extends along a longitudinal axis of the inlet generally aligned with a direction of flow of air as the air approaches the inlet, wherein the passageway defines an aperture at a first end of the passageway to receive a portion of the air as the intake air for delivery toward the engine at a second end of the passageway;
a surface outside the passageway and upstream of the aperture, wherein the surface includes at least one of a wing surface or a body surface; and
a control system including:
at least one first dielectric barrier discharge generator positioned along the surface along the longitudinal axis to apply a first force to a boundary layer of the air approaching the inlet, wherein the boundary layer includes air flowing adjacent to the surface, wherein the first force is transverse to the longitudinal axis; and
at least one second dielectric barrier discharge generator positioned along the surface such that the at least one second dielectric barrier discharge generator is between the at least one first dielectric barrier discharge generator and the aperture to apply a second force to a portion of the boundary layer, wherein the second force is directed parallel to the longitudinal axis or at an angle between the first force and the longitudinal axis, and wherein the second force accelerates the portion of the boundary layer toward the aperture or deflects the portion of the boundary layer away from the aperture.

2. The system of claim 1, wherein the at least one. first dielectric barrier discharge generator is oriented with a length extending in a direction having at least a component transverse to the longitudinal axis of the inlet.

3. The system of claim 1, wherein the at least one first dielectric barrier discharge generator is oriented with a length generally parallel to the longitudinal axis of the inlet.

4. The system of claim 1, wherein each of the dielectric barrier discharge generators is controlled for activation independently of each other dielectric barrier discharge generator.

5. The system of claim 1 wherein the at least one first dielectric barrier discharge generator comprises a plurality of first dielectric barrier discharge generators, and wherein the control system is configured to activate each of the plurality of first dielectric barrier discharge generators independently.

6. The system of claim 1, wherein the control system is configured to activate the at least one first dielectric barrier discharge generator independently of the at least one second dielectric barrier discharge generator.

7. The system of claim 1, wherein the at least one second dielectric barrier discharge generator is spaced from the longitudinal axis by a distance which is greater than a corresponding spacing of the at least one first dielectric barrier discharge generator from the longitudinal axis.

8. The system of claim 7, wherein each of the barrier discharge generators has a front end and a back end, and wherein the back end of the at least one first dielectric barrier discharge generator is positioned upstream of the front end of the at least one second dielectric barrier discharge generator.

9. The system of claim 7, wherein the control system further includes at least one intermediate barrier discharge generator which is disposed generally between the at least one first and the at least one second dielectric barrier discharge generators.

10. The system of claim 9, wherein the at least one intermediate barrier discharge generator is generally parallel with the at least one first dielectric barrier discharge generator.

11. The system of claim 7, wherein the at least one first dielectric barrier discharge generator and the at least one second dielectric barrier discharge generator are located on a first side of the longitudinal axis, wherein the system further comprises an opposing set of barrier discharge generators located on a second side of the longitudinal axis opposite the first side of the longitudinal axis, and wherein the opposing set of barrier discharge generators apply at least one third force to the air in a different direction from the first force and the second force.

12. The system of claim 11, wherein the opposing set of barrier discharge generators is generally symmetric about the longitudinal axis with other barrier discharge generators on the first side of the longitudinal axis.

13. The system of claim 1, wherein the at least one first dielectric barrier discharge generator is curved along at least a portion of a length of the at least one first dielectric barrier discharge generator, wherein a direction of the first force varies along at least the curved portion of the length.

14. The system of claim 13, wherein the at least one first dielectric barrier discharge generator has greater curvature toward an outboard lateral portion.

15. The system of claim 1, wherein the at least one second dielectric barrier discharge generator is at an orientation non-parallel with the at least one first barrier dielectric discharge generator.

16. The system of claim 15, wherein the at least one second dielectric discharge generator is oriented generally perpendicular to the longitudinal axis.

17. The system of claim 16, wherein the control system further includes a plurality of intermediate barrier discharge generators, wherein the plurality of intermediate barrier discharge generators are located generally between the at least one first dielectric barrier discharge generator and the at least one second dielectric barrier discharge generator and are placed at successively shallower angles with respect to the at least one first dielectric barrier discharge generator and the at least one second dielectric barrier discharge generator to transition a direction of force applied to the air between the first force and the second force.

18. A method of controlling an air induction system for an aircraft, the air induction system having an inlet to receive intake air for delivery toward an engine, the method comprising:
    activating at least one first dielectric barrier discharge generator to apply a first force to air moving relative to an inlet, wherein the at least one first dielectric barrier discharge generator is located along a surface of an aircraft, wherein the surface includes at least one of a wing surface and a body surface, and wherein the surface is upstream of the inlet to receive intake air for an engine such that at least a portion of the air moves past the surface prior to reaching the inlet; and
    activating at least one second dielectric barrier discharge generator to apply a second force to the air based on a flight condition of the aircraft, wherein the at least one second dielectric barrier discharge generator is downstream of the at least one first dielectric barrier generator,
    wherein the first force ejects a first portion of the air from an intake region of the inlet to divert the first portion of the air from being delivered to the engine and wherein the second force accelerates a second portion of the air toward the inlet when the second portion of the air is too near the inlet to be ejected, wherein the first and second forces are along non-parallel axes.

19. The method of claim 18, further comprising:
    activating-a first combination of dielectric barrier discharge generators in response to a first flight condition of the aircraft; and
    activating a second combination of dielectric barrier discharge generators different from the first combination in response to at a second flight condition of the aircraft.

20. The method of claim 18, wherein the second force is directed transverse to the fast force.

21. The method of claim 18, wherein the inlet has a longitudinal axis for alignment generally with a direction of flow of the air, and wherein the at least one first dielectric barrier discharge generator is misaligned with the longitudinal axis and the first force has a component which is transverse to the longitudinal axis.

22. The method of claim 21, wherein the at least one second dielectric barrier discharge generator is generally parallel to the at least one first dielectric barrier discharge generator and the second force has a component which is transverse to the longitudinal axis.

23. The method of claim 21, wherein the second force is directed at an angle between the first force and the longitudinal axis.

24. The method of claim 18, wherein the at least one first and the at least one second dielectric barrier discharge generators are arranged in spaced relation along the surface.

25. The method of claim 18, wherein the at least one first and the at least one second dielectric barrier discharge generators are arranged in one or more generally annular rows.

26. A system, comprising:
    an inlet defining an aperture to receive air for delivery toward an engine of an aircraft, wherein the inlet has a longitudinal axis generally aligned with a direction of flow of the air as the air approaches the inlet;
    a surface located upstream of the aperture such that at least a portion of the air moves past the surface prior to being received by the aperture; and
    a control system including:
        at least on first dielectric barrier discharge generator positioned along the surface on a first side of the longitudinal axis to apply a first force to the air;
        at least one second dielectric barrier discharge generator positioned along the surface on the first side of the longitudinal axis to apply a second force to the air, wherein the second force is in a different direction than a direction of the first force; and
        wherein the different direction is non-parallel to the direction of the first force.

27. The system of claim 26, wherein the control system further comprises at least one third dielectric barrier discharge generator positioned along the surface on the first side of the longitudinal axis to apply a third force to the air, wherein the third force is in a different direction than the first force and in a different direction than the second force.

28. The system of claim 26, wherein the first force has a component transverse to the longitudinal axis and the second force is generally parallel to the longitudinal axis.

29. The system of claim 26, wherein the first force acts to eject a first portion of the air from an intake region of the inlet and the second force acts to accelerate a second portion of the air toward the inlet when the second portion of the air is too near the inlet to be ejected.

30. A system, comprising:
    an inlet defining an aperture to receive air for delivery toward an engine of an aircraft, wherein the inlet has a longitudinal axis generally aligned with a direction of flow of the air as the air approaches the inlet;
    a surface located upstream of the aperture such that at least a portion of the air moves past the surface prior to being received by the aperture; and
    a control system including:
        a plurality of first dielectric barrier discharge generators positioned on opposing sides of the longitudinal axis to apply transverse forces to a first portion of the air passing over the plurality of first dielectric barrier discharge generators, wherein the transverse forces are transverse to the longitudinal axis; and
        one or more second dielectric barrier discharge generators positioned between the plurality of the first dielectric barrier discharge generators and the aperture to apply a second force to a second portion of the air passing over the one or more second dielectric barrier discharge generators, wherein the second force is substantially parallel to the longitudinal axis, wherein the transverse forces act to divert the first portion of the air from reaching the aperture and wherein the second force acts to accelerate the second portion of the air toward the aperture.

31. The system of claim 30, wherein the second force acts to accelerate the second portion of the air toward the aperture when the second portion of the air is too near the inlet to be ejected.

32. The system of claim 30, wherein each of the plurality of first dielectric barrier discharge generators is oriented with a length generally parallel to the longitudinal axis.

33. The system of claim 30, wherein the control system further includes at least one set of intermediate dielectric barrier discharge generators positioned on opposing sides of the longitudinal axis, wherein the at least one set of intermediate dielectric barrier discharge generators is positioned between the plurality of first dielectric barrier discharge generators and the one or more second dielectric barrier discharge generators, and wherein the at least one set of intermediate dielectric barrier discharge generators generate, intermediate forces in directions between directions of the transverse forces and the second force.

34. The system of claim 33, wherein the at least one set of intermediate dielectric barrier discharge generators are positioned at intermediate angles relative to the longitudinal axis such that lengths of each of the at least one set of intermediate dielectric barrier discharge generators are neither parallel to or transverse to the longitudinal axis.

* * * * *

UNITED STATES PATENT AND TRADEMARK OFFICE
CERTIFICATE OF CORRECTION

PATENT NO. : 7,637,455 B2  Page 1 of 1
APPLICATION NO. : 11/403252
DATED : December 29, 2009
INVENTOR(S) : Silkey et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 633 days.

Signed and Sealed this

Ninth Day of November, 2010

David J. Kappos
*Director of the United States Patent and Trademark Office*